Patented Aug. 19, 1947

2,426,111

UNITED STATES PATENT OFFICE 2,426,111

METHOD OF PRODUCING HARD ELECTRICALLY INSULATING ARTICLES FROM POLYISOBUTYLENE, STYRENE, AND DIVINYL BENZENE

Willi Mertens, Berlin-Zehlendorf, Germany; vested in the Attorney General of the United States No Drawing. Application September 19, 1939, Serial No. 295,606. In Germany September 13, 1938

4 Claims. (Cl. 18—47.5)

This invention relates to a method of additionally hardening mixtures of polyisobutylene, styrene and divinyl benzene, polymerized according to the method disclosed in the copending application Serial No. 202,011, filed April 14, 1938.

The above copending application relates to a method of hardening polymerized substances such as polyisobutylene consisting in homogeneously mixing these substances with an interpolymerizable mixture of at least two components capable of being polymerized, at least one of said components containing two polymerizable atom groups, and then interpolymerizing the total mixture. This method lends itself particularly to the production of articles from the named substances of a structure having linear chain molecules. As an example of an interpolymerizable mixture to be added to the substances to be hardened, a mixture of styrene and divinylbenzol is mentioned in the copending application. The method according to the copending application may be called a pseudo-vulcanization.

The invention consists in a method of additionally hardening natural or artificial substances treated according to the method disclosed in the above copending application. According to the invention the additional hardening is accomplished by subjecting the hardened substances to a subsequent heat treatment. In this case by the expression "heat treatment," such treatments are to be understood as are generally employed for the normal vulcanization; i. e., for instance, the named substances are subjected to steam at a temperature of 130 degrees centigrade; however, no vulcanizing agents are employed. The method according to the invention is particularly employed for polyisobutylene treated according to the method disclosed in the above copending application.

The products produced according to the invention have not only a particularly high degree of hardness but they present the great advantage that they may be softened at individual or all points by a mechanical operation and then rehardened by a further heat treatment. The mechanical operation may consist in a kneading or rolling operation. Consequently, waste material may be utilized when producing other products. To attain the desired hardness it is, as a rule, sufficient to heat-treat the products, for instance, for half an hour at a temperature of 130 degrees centigrade. Of course, in this case the hardening period, besides being dependent upon the temperature, depends also upon the thickness of the products to be hardened. It is preferable to carry out the method according to the invention in steam free of oxygen or in a protective gaseous atmosphere. The substances treated according to the invention have a low thermal conductivity. It is, therefore, preferable to quench the substances hardened, in cold water or in a cold current of air or in any other similar manner in order to avoid extensive cooling periods.

The method according to the invention may also be carried out in the manner that materials treated according to the invention are mixed with pure starting materials, i. e., such starting materials which have not yet been treated according to the method of the above-mentioned copending application. For instance, a substance, pseudo-vulcanized according to the invention and containing polyisobutylene, may be mixed with pure, i. e., untreated polyisobutylene. If the same degree of hardness is to be attained in this mixture as in the portion of the pseudo-vulcanized substance contained therein, a corresponding quantity of the interpolymerizable substance, for instance of the styrene divinylbenzol mixture, computed in accordance with the quantity of polyisobutylene is added thereto, considerable periods being then necessary to additionally harden the total mixture.

The hardening effect obtained by the method according to the invention can be attributed to the fact that the particles of the interpolymerizable substance, for instance of the styrene divinylbenzol polymer, added according to the above-mentioned copending application to a chain-molecular polymer base, conglomerate in a network-like manner owing to the heat treatment so as to form considerable complexes. This network is again destroyed by the mechanical operation.

The invention may be employed, for instance, in all such cases where products must be temporarily in a deformable state and temporarily in a less or non-deformable state as the case may be. If therefore conduits for electric conductors, made of artificial substances are to be laid, the conduits may be first hardened according to the invention so that they are rigid or solid and do not sag when laid and the conduits are deformed to the desired degree by a simple mechanical operation at the points where there should be bends, curbed tube portions, etc.

The above-mentioned example of a composition containing a base of polyisobutylene and an addition consisting of a mixture of styrene plus divinylbenzol may contain 70 parts of the base substance and 30 parts of the mixture, the amount of divinylbenzol in the mixture being about 1%. This composition corresponds to Example 3 as described in the copending application. The substances are thoroughly mixed and shaped and then heat-polymerized until a rubber or leather-like product is obtained.

As afore-described this product is subjected to a further heat treatment without addition of vulcanizing agents, for instance, by applying steam of 130° C. until the material becomes rigid. The hardened product may be softened locally or over any desired area by subjecting it to a kneading, rolling or the like mechanical operation.

What is claimed is:

1. The method of producing solid electrically insulating articles which comprises the steps of preparing a homogeneous mixture of a quantity of polyisobutylene with a quantity of monomeric styrene and divinylbenzol associated with a polymerization-favoring ingredient, heating the total mixture to polymerize the monomers in the presence of the polyisobutylene, obtaining a prehardened material, subjecting said prehardened material to a kneading treatment thereby softening the material and subjecting the softened material to another heat treatment at a temperature of about 130° C. to reharden the material in order to obtain a rigid end product.

2. The method of producing solid electrically insulating articles which comprises the steps of preparing a homogeneous mixture of a preponderant quantity of polyisobutylene with a smaller quantity of monomeric styrene and divinylbenzol associated with a polymerization-favoring ingredient, heating the total mixture to completely polymerize the monomers in the presence of the polyisobutylene, obtaining a prehardened material, subjecting selected areas of said prehardened material to a kneading treatment thereby softening said selected areas and subjecting the softened said selected areas to another heat treatment to reharden the said selected areas in order to obtain a rigid end product.

3. The method of producing tubing for electric insulating purposes which comprises the steps of preparing a homogeneous mixture of a preponderant quantity of polyisobutylene with a smaller quantity of monomeric styrene and divinylbenzol associated with a polymerization-favoring ingredient, shaping and heating the total mixture to polymerize the monomers in the presence of the polyisobutylene, obtaining a prehardened material, subjecting selected areas of said prehardened material to a kneading treatment thereby softening the material and subjecting the softened material to another heat treatment at a temperature of about 130° C. to reharden the material in order to obtain a rigid end product.

4. The method of producing solid electrically insulating articles which comprises the steps of preparing a homogeneous mixture of a preponderant quantity of polyisobutylene with a smaller quantity of monomeric styrene and divinylbenzol associated with a polymerization-favoring ingredient, subjecting to steam at normal vulcanization temperature the total mixture to completely polymerize the monomers in the presence of the polyisobutylene, obtaining a prehardened material, subjecting said prehardened material to a kneading treatment thereby softening the material and subjecting the softened material to another heat treatment to reharden the material in order to obtain a rigid end product quenching said product with cold fluid to avoid too long cooling period.

WILLI MERTENS.

REFERENCES CITED

The following references are of record in the file of this patent:

UNITED STATES PATENTS

| Number | Name | Date |
|---|---|---|
| 2,155,590 | Garvey | Apr. 25, 1939 |
| 2,120,006 | Strain | June 7, 1938 |
| 2,101,107 | Strain | Dec. 7, 1937 |
| 2,078,194 | Collins | Apr. 20, 1937 |
| 2,066,330 | Carothers et al. | Jan. 5, 1937 |
| 2,202,846 | Garvey | June 4, 1940 |
| 2,180,082 | Mueller-Cunradi et al. | Nov. 14, 1939 |

FOREIGN PATENTS

| Number | Country | Date |
|---|---|---|
| 355,416 | Great Britain | Aug. 27, 1931 |
| 396,186 | Great Britain | Aug. 3, 1933 |